Jan. 10, 1928.
L. L. DA COSTA
1,655,646
LIQUID DISPENSING APPARATUS
Filed Jan. 17, 1927    2 Sheets-Sheet 1
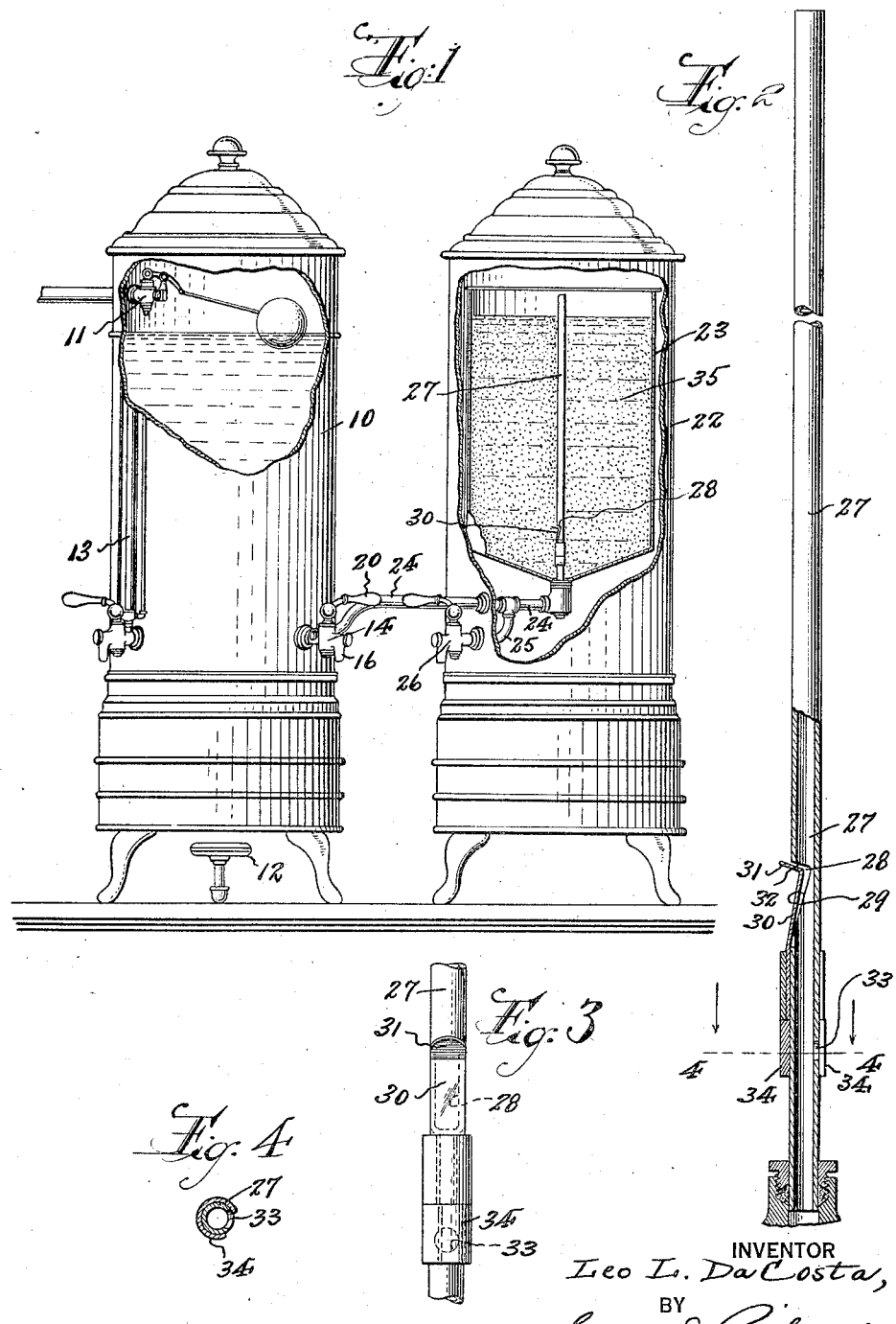
INVENTOR
Leo L. DaCosta,
BY
George D. Richards
ATTORNEY Jan. 10, 1928.
L. L. DA COSTA
1,655,646
LIQUID DISPENSING APPARATUS
Filed Jan. 17, 1927  2 Sheets-Sheet 2
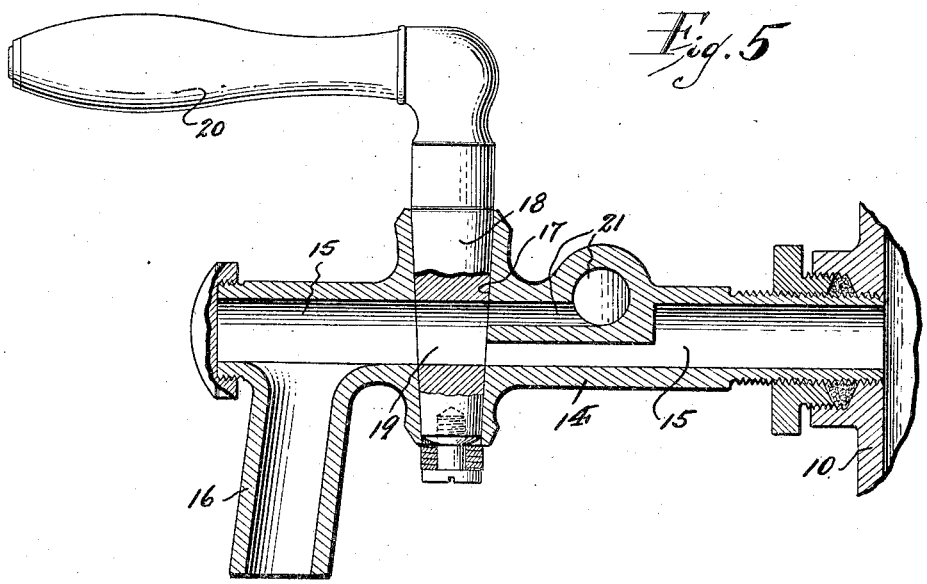
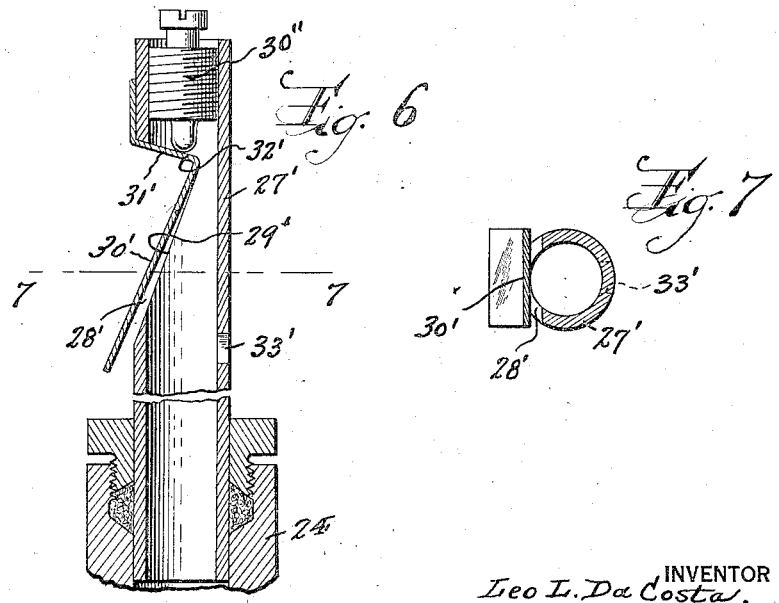
INVENTOR
Leo L. Da Costa,
BY
George D. Richards
ATTORNEY Patented Jan. 10, 1928.

1,655,646

UNITED STATES PATENT OFFICE.

LEO L. DA COSTA, OF IRVINGTON, NEW JERSEY.

LIQUID-DISPENSING APPARATUS.

Application filed January 17, 1927. Serial No. 161,557.

This invention relates, generally, to improvements in liquid dispensing apparatus, such, for example, as coffee urns and the like.

This invention has for its principal object to provide a novel construction of apparatus adapted to dispense a potable liquid and at the same time furnish the discharged liquid with a desired flavoring ingredient. For example, this invention contemplates the provision of an urn or reservoir to contain a base liquid and a companion urn or reservoir to contain the flavoring ingredient; the former having a discharge faucet constructed and arranged for connection with the latter so as to automatically draw both the base liquid and flavoring ingredient and intermix the same together as they flow outwardly through the faucet. In a dispensing apparatus of such type it is highly desirable to assure an equalized flow of the flavoring ingredient so that overcharging or undercharging of the dispensed base liquid with the flavoring ingredient is avoided. Since the flow of flavoring ingredient to the mixing discharge faucet is by gravity; and, since, under such circumstances diminishing of the volume and head of such flavoring ingredient in the containing urn or reservoir tends to diminish the speed and volume of flow thereof, it is necessary to provide means to equalize the flow under changing conditions of volume and head in the supply reservoir. My present invention, therefore, has for a further object to provide a novel automatic flow equalizing discharge valve in connection with the outlet of said liquid ingredient reservoir.

Other objects of this invention, not at this time more particularly enumerated, will be clearly understood from the following detailed description of the same.

The invention is clearly illustrated in the accompanying drawings, in which:—

Figure 1 is in part a front elevation and in part a sectional view of a liquid dispensing apparatus made according to and embodying the principles of this invention.

Figure 2 is a longitudinal sectional view of the novel automatic flow equalizing discharge valve for controlling the flow under gravity of a flavoring ingredient from its supply reservoir; Figure 3 is a fragmentary face view of the same; and Figure 4 is a detail cross-section through the same, taken on line 3—3 in Figure 2.

Figure 5 is a sectional view, on an enlarged scale, of a mixing faucet for dispensing the potable liquid.

Figure 6 is a sectional view, on an enlarged scale, of a modified form of automatic flow equalizing discharge valve; and Figure 7 is a horizontal section, taken on line 7—7 in said Figure 6.

Similar characters of reference are employed in all of the hereinabove described views, to indicate corresponding parts.

In the herefollowing specification of one embodiment of the principles of my instant invention, I shall describe, by way of example, the application thereof to a dispensing apparatus in the form of a coffee urn in which provision is made to treat hot water, as it is drawn from a supply thereof, with a proper proportion of concentrated coffee essence or extract for intermixture therewith so as to produce and deliver coffee ready for drinking.

The novel dispensing apparatus, in such form, comprises a main water reservoir 10, which is provided with a float controlled water feed valve 11 for automatically maintaining the reservoir 10 in filled condition at constant head or pressure. As is ordinarily the practice, a gas-burner 12 is situated beneath the water reservoir 10 to both heat the water and maintain the same at desired serving temperature. If desired, the water reservoir 10 may also be provided with the usual gauge glass 13 and connecting fittings to visually indicate the level of water content in said reservoir. Connected with the side of said water reservoir 10, towards the lower end thereof, is a faucet 14 having an outlet duct 15 leading from the interior of said reservoir 10 to and through the spout 16. Intersecting said outlet duct 15 is the usual valve seat 17 in which is rotatably arranged the valve plug 18, the port 19 of which may be brought into aligment with the duct 15 when said plug is turned to open position by means of the handle 20 connected with the upper exterior end of said valve plug. Said faucet 14 is provided, rearwardly of the valve plug 18, with an auxiliary intake duct 21 which parallels the main duct 15, and the outlet end of which terminates at the side of the valve seat 17, so that the same is closed by the valve plug 18, when the latter is turned to closed position, but which communicates, in common with the main duct 15 with the valve port 19, when said valve plug is turned to open position.

The reference character 22 indicates a companion urn situated by the side of the water reservoir 10. Within this urn 22 is disposed a coffee essence or extract reservoir 23, communicating with the lower end of which is a supply pipe 24, which leads outwardly from the urn 22 for connection with the auxiliary intake duct 21 of the mixing faucet 14. Connected in the line of said supply pipe 24 is a branch pipe 25 which leads to an exterior faucet 26 with which the urn 22 is provided, and the purpose of which will be hereinafter disclosed.

While I have described the coffee essence or extract reservoir 23 as mounted within the companion urn 22, it will be understood that this is done for the sake of appearance rather than from necessity; it will be apparent that the urn 22 may be eliminated and the reservoir 23 otherwise supported in operative association with the main water reservoir 10.

Arranged within the coffee essence or extract reservoir 23 to operatively communicate with the supply pipe 24 is a novel automatic flow equalizing discharge valve. One form of such automatic flow equalizing discharge valve is shown in Figures 1 to 4 inclusive, and in such form comprises a stand-pipe 27 extending upwardly through the interior of the reservoir 23, with its lower end suitably connected in communication with the receiving end of said supply pipe 24. At a point adjacent to the connection thereof with said supply pipe 24, the side of said stand-pipe is provided with an intake port 28 so formed as to provide an inwardly and upwardly inclined beveled seat 29. Fixed by one end on the exterior of said stand-pipe is a resilient or spring-leaf valve 30, having at one end an angular extension 31 to cooperate with the undercut upper end 32 of said intake port 28, while the body of the same is movable toward and engageable with the beveled seat 29 of said intake port 28. The inherent tension of said resilient or spring-leaf valve 30 normally tends to move the same away from the beveled seat 29 and into open position. Provided in the opposite side of said stand-pipe 27, and preferably at a point below the level of said intake port 28 is an auxiliary intake port or opening 33. Means may be provided for varying or adjusting the size of this auxiliary intake port or opening 33; in one form this means comprising a discontinuous annular closure 34 rotatable on said stand-pipe, so that an end of the same may be moved to any desired degree across the area of said auxiliary intake port or opening 33.

In operation, the reservoir 23 is filled with a predetermined quantity of fluid coffee essence or extract 35, and the water in the water reservoir 10 being brought to the desired temperature, the apparatus is ready for use.

When it is desired to dispense a cup of coffee, the faucet 14 is turned to open position to cause an out-flow of hot water into the cup or other receptacle in which the coffee is to be served. As the hot water flows outwardly through the main duct 15 of the faucet, the auxiliary duct 21 delivers also through the open valve of the faucet a quantity of coffee essence or extract 35, which is supplied from the reservoir 23 through the supply pipe 24 to said auxiliary duct 21, so that the same is mixed with the hot water discharging from the faucet, thereby producing at the time of delivery the desired coffee drink.

It will be readily understood, that were no means provided to equalize the flow of coffee essence or extract from the reservoir 23, the discharge thereof would be most rapid when the reservoir contained its initial maximum or full volume and head, but would tend to decrease as such volume and head diminished, so that at first the more rapid initial delivery of the coffee essence or extract during the period of time the faucet 14 must remain open to discharge the desired cupful of liquid would tend to furnish a quantity of essence or extract calculated to produce coffee of desired strength, but as the volume and head of the coffee essence or extract diminishes in the reservoir 23, the speed of delivery of the same would steadily diminish so that during a corresponding period of time the faucet 14 remains open, the quantity of essence or extract would be proportionately decreased, and the cup of coffee produced would consequently lack normal desired strength. Such undesirable results are avoided in my apparatus by the functioning of the automatic flow equalizing discharge valve provided in connection with the supply pipe 24.

In operation, assuming the reservoir 23 to be full, when the faucet 14 is open to draw, with the outgoing hot water, coffee essence or extract through the supply pipe 24 from the reservoir 23, the flow from the latter enters the auxiliary port 33 of the stand-pipe 27 in a predetermined quantity according to the size to which said port 33 has been adjusted, the flow moving through the stand-pipe 27, and thence outwardly into and through the supply pipe 24 to the mixing faucet. With full volume and head of coffee essence or extract, the pressure of the same upon the spring-leaf valve 30 will be at the maximum, and consequently as outflow of liquid from the stand-pipe 27 is initiated upon the opening of the faucet 14, a suction effect is set up within the stand-pipe 27 above the auxiliary port 33 which unbalances the fluid pressure on the inner side of said spring-leaf valve relative to the pressure exerted by the volume and head of liquid at the outer side of said valve, and consequently the valve is moved against its inherent tension toward the seat 29 to restrict the intake port 28. As the volume and head of coffee essence or extract diminishes within the reservoir 23, the external pressure exerted thereby on the spring-leaf valve 30 proportionally dimishes so that the tension of the latter is decreasingly overcome, with the effect that the valve opens more and more widely, thus admitting more liquid through the port 28 and consequently tending to compensate for the quantitative losses of flow through the port 33 of fixed size, during a given period of time in which the faucet 14 remains open, which losses result from diminished speed of flow proportional to the lessening of volume and head of liquid in the reservoir 23.

In this manner out flow through the stand-pipe 27 is compensatingly increased in proportion to the decrease of volume and head of liquid in the reservoir 23 as the supply thereof is drained away by the use of the apparatus, and consequently the total quantitative flow of liquid to and through the supply pipe 24 during each open period of the faucet 14 is substantially equalized and kept practically uniform and undisturbed by the losses of volume and head of liquid in the reservoir 23 as the supply of such liquid is gradually decreased. It follows that each cup of hot water drawn from the main reservoir 10 through the faucet 14 will receive a proper proportion of coffee essence or extract for intermixture therewith to produce the hot coffee drink, as long as the supply of coffee essence or extract lasts.

Since it may be desirable, especially in hot weather, to furnish iced coffee, the faucet 26 is provided in connection with the supply pipe 24 to directly draw coffee essence or extract from the reservoir 23 and deliver the same to glasses or other receptacles for intermixture with ice-water.

Referring now to Figures 6 and 7 of the accompanying drawings, I have illustrated therein a slightly modified construction of automatic flow equalizing discharge valve means for use in connection with the reservoir 23. In this form, I provide an outlet pipe 27' for communicating connection with the supply-pipe 24; said outlet pipe having a fixed port 33' at one side thereof, and at the opposite side thereof and above the position of said fixed port 33', the same is provided with a compensating or variable intake port 28' formed to provide an inwardly and upwardly inclined beveled seat 29'. Fixed by one end on the exterior of said outlet pipe 27' is a spring-leaf valve 30' having adjacent its fixed end an angular extension 31' to cooperate with the undercut upper end 32' of the intake port 28', the main body of the spring-leaf valve extending freely downward from said angular extension so as to be movable toward and engageable with the beveled seat 29'. The upper end of said outlet pipe 27' is internally screw-threaded to receive a leaf-spring valve tension adjusting screw 30" which by bearing on the angular extension 31' may be caused to more or less vary the tension of the leaf-spring valve as well as its normal position relative to the valve seat 29' to render the same more or less sensitive to closing pressure, and thereby permitting the same to be nicely adjusted for the performance of its function. This modified form of equalizing valve means functions in substantially the same manner as does the first described form of valve the operation of which is above set forth.

While I have described my instant invention with special reference to its use in connection with coffee urns and similar apparatus, it will, of course, be understood that its employment is not confined to such specific purposes, but that the principles thereof may be applied to many other kinds of apparatus in which it is desirable to equalize the gravity flow of liquid from a container under diminishing conditions of volume and head.

It will also be obvious that many alterations and variations may be made with respect to my above described invention which will still be comprised within its spirit. Generally speaking, it is to be understood the invention is not limited to any specific form or adaptation except in so far as such limitations are specified in the appended claims.

Having thus described my invention, I claim:—

1. In an apparatus of the kind described, the combination with a main reservoir to contain a base liquid, a dispensing faucet connected with said reservoir, an auxiliary reservoir to contain a liquid ingredient for mixture with said base liquid, a supply pipe extending between said auxiliary reservoir and said faucet, and means intermediate the interior of said auxiliary reservoir and the receiving end of said supply pipe for equalizing the gravity flow of said liquid ingredient under diminishing volume and head within said auxiliary reservoir.

2. In an apparatus of the kind described, the combination with a main reservoir to contain a base liquid, means to supply said base liquid to said main reservoir so as to maintain a substantially constant volume and head thereof within the same, a dispensing faucet connected with said reservoir, an auxiliary reservoir to contain a liquid ingredient for mixture with said base liquid, a supply pipe extending between said auxiliary reservoir and said faucet, and means intermediate the interior of said auxiliary reservoir and the receiving end of said supply pipe for equalizing the gravity flow of said liquid ingredient under diminishing volume and head within said auxiliary reservoir.

3. In an apparatus of the kind described, the combination with a main reservoir to contain a base liquid having a float controlled admission valve to automatically supply said base liquid from a suitable source so as to maintain the volume and head thereof constant within said reservoir, a dispensing faucet connected with said main reservoir, an auxiliary reservoir to contain a liquid ingredient for mixture with said base liquid, a supply pipe leading from said auxiliary reservoir, said dispensing faucet having a liquid ingredient discharge passage with which said supply pipe communicates, and means intermediate the interior of said auxiliary reservoir and the receiving end of said supply pipe for equalizing the gravity flow of said liquid ingredient under diminishing volume and head within said auxiliary reservoir.

4. In an apparatus of the kind described, the combination with a main reservoir to contain a base liquid having a float controlled admission valve to automatically supply said base liquid from a suitable source so as to maintain the volume and head thereof constant within said reservoir, a dispensing faucet connected with said main reservoir, an auxiliary reservoir to contain a liquid ingredient for mixture with said base liquid, a supply pipe leading from said auxiliary reservoir, said dispensing faucet having a liquid ingredient discharge passage with which said supply pipe communicates, and means intermediate the interior of said auxiliary reservoir and the receiving end of said supply pipe for equalizing the gravity flow of said liquid ingredient under diminishing volume and head within said auxiliary reservoir, said means comprising an outlet pipe in communication with said supply pipe, said outlet pipe having an intake port provided with a yieldable valve means opening under its tension, and said outlet pipe also having a continuously open auxiliary port.

5. In an apparatus of the kind described, the combination with a main reservoir to contain a base liquid, of an auxiliary reservoir to contain a liquid ingredient for mixture with said base liquid, a dispensing and mixing faucet in communication with said main and auxiliary reservoirs, and means for equalizing the gravity flow of said liquid ingredient under diminishing volume and head within said auxiliary reservoir.

6. In an apparatus of the kind described, the combination witth a main reservoir to contain a base liquid, of an auxiliary reservoir to contain a liquid ingredient for mixture with said base liquid, a dispensing and mixing faucet in communication with said main and auxiliary reservoirs, and means for equalizing the gravity flow of said liquid ingredient under diminishing volume and head within said auxiliary reservoir, said means comprising an outlet pipe in communication with said supply pipe, said outlet pipe having an intake port provided with a yieldable valve means opening under its tension, and said outlet pipe also having a continuously open auxiliary port.

7. In an apparatus of the kind described, the combination with means to supply a base liquid under constant head, of auxiliary means to supply by gravity a liquid ingredient for mixture with said base liquid, means to intermix said liquids, and means to equalize the flow of said liquid ingredient under diminishing head.

8. In a reservoir to supply liquid by gravity flow, a delivery means, an outlet pipe within said reservoir to communicate with said delivery means, said outlet pipe having an intake port provided with a yieldable valve means opening under its tension, and said outlet pipe also having a continuously open auxiliary port.

9. In a reservoir to supply liquid by gravity flow, a delivery means, an outlet pipe within said reservoir to communicate with said delivery means, said outlet pipe having in its side an intake port formed to provide an oblique bounding valve seat, a spring-leaf valve exteriorly connected with said outlet pipe having its free end portion opposed to said intake port and engageable with said oblique valve seat, said spring-leaf valve tending to open under its inherent tension, and said outlet pipe also having a continuously open auxiliary port.

10. In a reservoir to supply liquid by gravity flow, a delivery means, an outlet pipe within said reservoir to communicate with said delivery means, said outlet pipe having in its side an intake port formed to provide an oblique bounding valve seat, a spring-leaf valve exteriorly connected with said outlet pipe having its free end-portion opposed to said intake port and engageable with said oblique valve seat, said spring-leaf valve tending to open under its inherent tension, said outlet pipe also having a continuously open auxiliary port, and means to vary the size of said open auxiliary port.

In testimony that I claim the invention set forth above I have hereunto set my hand this 13th day of January, 1927.

LEO L. DA COSTA.